June 30, 1925.
J. T. TERRY
PROCESS OF TREATING ORES
Filed Oct. 29, 1924
1,544,197
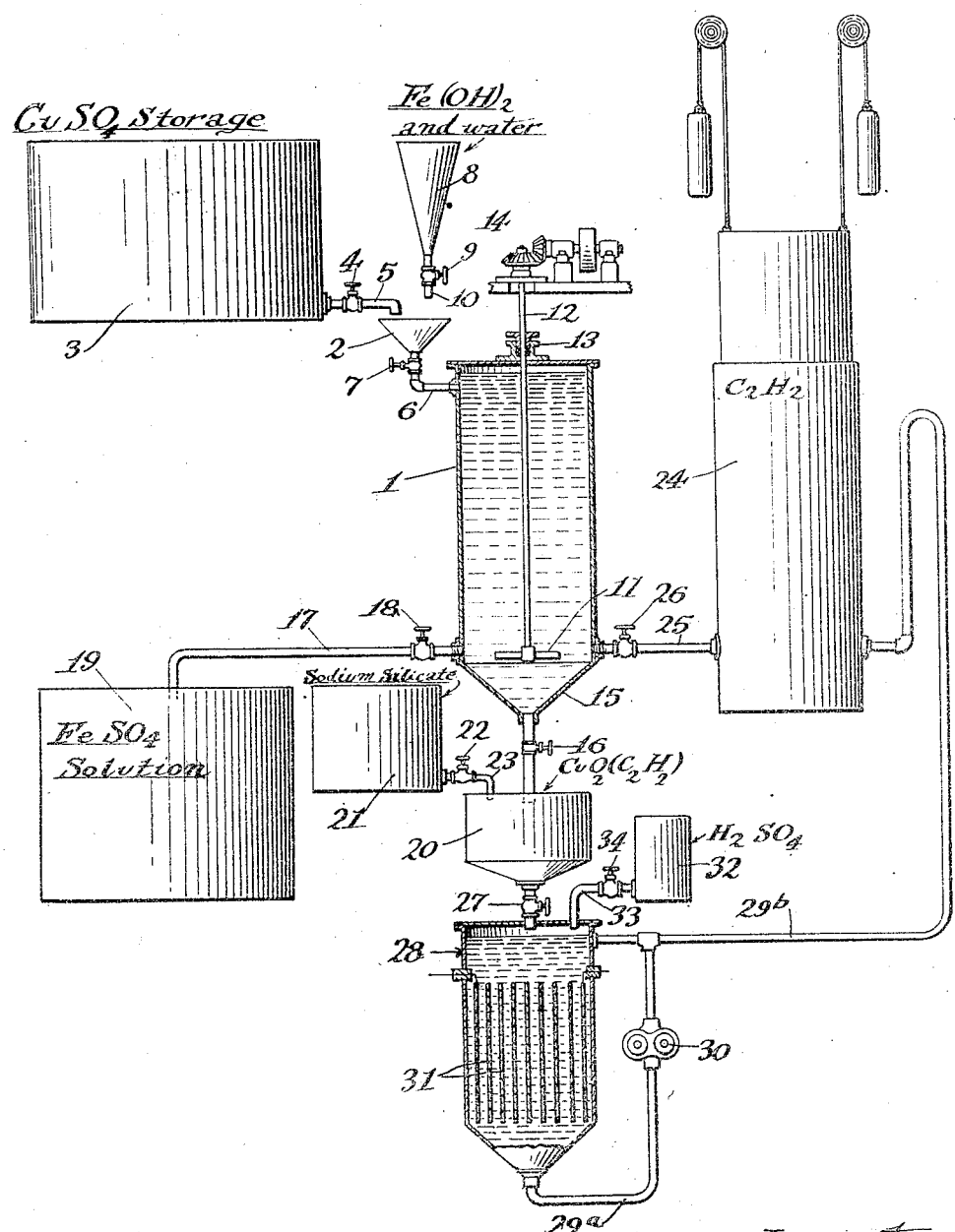

Patented June 30, 1925.

1,544,197

UNITED STATES PATENT OFFICE.

JOSEPH T. TERRY, OF ALHAMBRA, CALIFORNIA, ASSIGNOR OF ONE-HALF TO JAMES E. LACY AND ONE-EIGHTH TO RICHARD H. LACY, BOTH OF LOS ANGELES, CALIFORNIA.

PROCESS OF TREATING ORES.

Application filed October 29, 1924. Serial No. 746,527.

*To all whom it may concern:*

Be it known that I, JOSEPH T. TERRY, a citizen of the United States, residing at Alhambra, in the county of Los Angeles and State of California, have invented new and useful Improvements in Processes of Treating Ores, of which the following is a specification.

My invention relates to a process of recovering metals, such as copper, silver, mercury, and possibly other metals such as nickel, osmium, palladium or combinations thereof.

It is an object of this invention to provide a simple, efficient and economical process of recovering metals in solution capable of forming an insoluble compound with acetylene.

My invention consists in the steps of the process hereinafter described and claimed.

In the accompanying drawings, which form a part of the specification, I have shown diagrammatically an apparatus suitable for carrying out my process.

Referring to the drawings, 1 represents a gas tight tank in which precipitation is carried out, and is provided with a funnel 2 for receiving solution from storage tank 3 through shut-off valve 4 and pipe 5. The funnel 2 leads to tank 1 by pipe 6, controlled by cut-off valve 7. 8 is a tank for acid soluble solids preferably in precipitate form or finely divided, which is introduced into tank 1 through shut-off valve 9, pipe 10 and receiving funnel 2.

Vertically disposed in tank 1 is a rotatable stirrer 11 mounted on shaft 12 which passes through a packing gland 13 and is revolved by gears 14 in a conventional manner. Tank 1 is constructed with an inverted cone bottom 15, terminating with a drawing off valve 16. Above the cone 15 is a decanting pipe 17 controlled by shut-off valve 18 and leads to a solution storage tank 19.

Directly below discharge valve 16 of tank 1 is a precipitate-receiving tank 20. 21 represents a reagent tank for an air excluding agent such as sodium silicate, provided with a shut-off valve 22 and pipe 23 leading to precipitate receiving tank 20. An acetylene gas generator or gasometer 24 is provided for supplying acetylene gas to tank 1 by means of pipe 25 controlled by shut-off valve 26. 27 is a shut-off valve controlling communication between precipitate receiving tank 20 and a closed electrolytic cell 28 provided with suitable anodes and cathodes 31 for the deposition of copper. A gas circulatory system is provided composed of pipes 29$^a$, 29$^b$ and pump 30. Pipe 29$^b$ also communicates with gasometer 24 and serves to return acetylene gas. 32 is a sulphuric acid container having a pipe 33 controlled by valve 34 communicating with electrolytic cell 28.

My process takes consideration of the fact that in neutral or slightly acid solutions containing metals to be recovered acetylene reacts with cupric and mercuric salts in the presence of iron; also that a copper sulphite solution free from iron when treated with acetylene forms copper precipitate, $CuSO_3$, $Cu_2SO_3$, due to gas displacement the acetylene displacing the sulphur dioxide. However, if iron is present copper acetylide is formed.

In carrying out my process a tank 1 is charged with a copper sulphate solution drawn from a storage tank 3 and a suitable amount of ferrous hydroxide mixed with water is introduced from tank 8 into tank 1 to combine with free acid present and leave a slight excess of undissolved ferrous hydroxide. Valve 7 is then closed and acetylene introduced into tank 1 from the acetylene generator 24 through pipe 25. The liquid in tank 1 in the presence of acetylene is vigorously agitated, and the following reaction takes place:

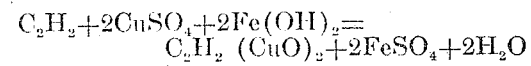
$$C_2H_2 + 2CuSO_4 + 2Fe(OH)_2 =$$
$$C_2H_2(CuO)_2 + 2FeSO_4 + 2H_2O$$

When the reaction is complete agitation is stopped, and the copper acetylide allowed to settle.

The supernatant ferrous sulphate solution is then decanted through pipe 17 into storage tank 19.

The copper acetylide precipitate at the bottom of tank 1 is then discharged through valve 16 into receiving tank 20. Sodium silicate is then added to the copper acetylide from tank 21 through pipe 23. The copper acetylide may now be removed from tank 20 and dried and smelted to elemental copper. As well known, copper and silver acetylides being normally explosive, and therefore dangerous to handle when dry, are harmless and safe to manipulate when dried and decomposed out of contact with air.

The sodium silicate mixed with a copper acetylide has the function to prevent access of air and render the copper acetylide non-explosive.

In place of sodium silicate other agents may be used to prevent access of air, such as sodium sulphide, sulphur dioxide, carbon dioxide, hydrochloric acid or the air may be exhausted to a degree so that there will be no danger of the copper acetylide exploding.

My invention is particularly applicable to solutions containing sulphates and chlorides of copper, with or without silver, resulting from the leaching of ores which may or may not have been previously roasted.

As an alternative step in the process I may transfer the copper acetylide precipitate from receiving tank 20 into an electrolytic cell 28 and in the presence of dilute sulphuric acid decompose the copper acetylide by electrolytic action depositing the copper in elemental form on cathodes 31, and recovering acetylene gas which is conveyed by pipe 29 to gasometer 24. The pump 30 causes a circulation of the gas through the electrolyte and by agitation maintains the suspension of undecomposed copper acetylene precipitate.

Various changes in the construction and arrangement of parts of the apparatus, as well as in the steps of the process, may be made by those skilled in the art without departing from the spirit of my invention, as claimed.

I claim:

1. A process of precipitating and recovering metals in a neutral or slightly acid solution, comprising introducing acetylene in presence of an iron salt to precipitate metal in the form of metal acetylide and separating the metal acetylide from the mixture under the exclusion of air.

2. A process of precipitating and recovering metals in a neutral or slightly acid solution, comprising introducing acetylene in the presence of an iron salt, separating the metal acetylide formed and drying the metal acetylide under the exclusion of air.

3. A process of precipitating and recovering copper in solution, consisting of adding ferrous hydroxide to neutralize any free acid, treating the solution with acetylene to form copper acetylide, and separating the copper acetylide from the mixture and drying the same out of contact with air.

In testimony whereof I have signed my name to this specification.

J. T. TERRY.